United States Patent Office 3,062,728
Patented Nov. 6, 1962

3,062,728
METHOD OF PROCESSING POLYPHENYL
NUCLEAR REACTOR COOLANT
Wayne E. Duffy, Pleasanton, Calif., assignor to
North American Aviation, Inc.
No Drawing. Filed Dec. 21, 1959, Ser. No. 860,738
6 Claims. (Cl. 204—154.2)

My invention relates to a method of cracking higher polyphenyl polymers, and more particularly to a method of reconstituting polyphenyl coolants.

Polyphenyls, particularly diphenyl and terphenyl, are employed as industrial heat transfer agents. For instance, the industrial coolants sold under the trade name "Dowtherm" are based on polyphenyls. Furthermore, nuclear reactors use such polyphenyls as coolants and neutron moderators. Under the effects of heat and/or radiation the polyphenyl coolant polymerizes into viscous polymers with poorer heat transfer characteristics. Such degradation products are generally removed from the undamaged coolant by distillation and replaced with fresh coolant. The high boiler polymer residue consists primarily of higher polyphenyl molecules, particularly hexaphenyl and nonaphenyl. The separated high boiler polymer mass is then disposed of by storage or by burning.

The amount of original polyphenyl coolant lost in this manner is of economic significance. For instance, in the operation of a polyphenyl-cooled nuclear reactor, organic make-up costs approach 1 mill per kilowatt hour of generated power. Reforming of the polymer residue into useful coolant fractions would, therefore, be of considerable benefit.

The principal object of my present invention is to provide a process for reforming polyphenyl degradation products into re-useable coolant fractions.

Another object of my invention is to provide a process for converting high boiling polyphenyl polymers into re-useable coolant fractions.

Another object is to provide an over all method of processing polyphenyl reactor coolant so as to minimize fresh coolant make-up.

Another object is to purify polyphenyl reactor coolant withdrawn from a reactor by distillation, reconstitute the still pot residue into useable coolant fractions, and return the reconstituted coolant and the distillate to the reactor.

Still another object is to provide a method of converting hexaphenyl and nonaphenyl to terphenyl.

Yet another object is to provide a process for converting higher polyphenyls into terphenyl.

A further object is to provide such a process which is convenient, rapid and economical.

Other objects and advantages of my invention will become apparent from the following detailed description and the appended claims.

In accordance with my present invention, polyphenyl coolants may be reconstituted by hydrogenating the high boiler degradation products at a temperature of about 250-575° C.

I have found that the condensation reaction of polyphenyls into higher polymers is unexpectedly highly reversible under relatively mild conditions. The high boiler compounds are readily cracked into re-useable coolant fractions in my invention under conditions where terphenyl cannot be cracked into benzene or diphenyl.

By the term "high boiler" it is intended to designate pyrolytic and/or radiolytic degradation compounds of polyphenyls initially consisting essentially of 2–3 phenyl rings, and having higher boiler points than para-terphenyl. (Para-terphenyl is the highest boiling terphenyl isomer, and has a boiling point of about 730° F. at 1 atm.)

Polyphenyl compounds with four or more phenyl rings are not initially used as industrial reactor coolants. Terphenyl has a molecular weight of 231; the normal commercial mixture of terphenyl isomers has a melting point of about 310° F. and a boiling point of about 710° F. Commercial terphenyl mixtures, such as are now employed in organic cooled reactors, typically have the following composition: ortho-terphenyl 5.0–13.0%; meta-terphenyl 46–58.3%; para-terphenyl 24–32.5%; diphenyl 0.2–1.9.

The high boilers remaining in a still pot after distillation of polyphenyl coolant consists primarily of unsubstituted polyphenyls containing 4–9 rings. Hexaphenyl is the principal product of terphenyl polymerization, with smaller amounts of nonaphenyl (about a 4–5 to 1 ratio of hexaphenyl). Smaller amounts of such other compounds as triphenylenes and phenanthrenes are also contained. In the typical organic moderated reactor, the high boiler concentration of the coolant is maintained at about 30% by distillation, because up to about 30% polymer the coolant characteristics are not significantly affected. The Organic Moderated Reactor Experiment reactor (OMRE), for example, distills the terphenyl coolant on a batch basis at 20 mm. Hg until the overhead vapor reaches about 510±10° F., which distills over everything which boils below triphenylene. The distillation is readily accomplished in an open column without reflux.

I find that the reconstitution reaction is an endothermic gas phase reaction which takes place rapidly, in the order of a few seconds. The high boilers must therefore be heated sufficiently to vaporize the mixture. This ranges from about 350°–550° C. at atmospheric pressure. The reconstitution reaction itself very satisfacorily takes place at temperatures of about 250°–275° C. A particularly useful temperature range is about 400–500° C. Treatment of the high boilers in a nuclear reactor in this manner yields a product, primarily terphenyl, which is readily re-useable in the reactor as a coolant-moderator.

The hydrocarbon-hydrogen ratio may satisfactorily vary during the reconstitution reaction. For example, the hydrogen-hydrocarbon mole ratio may satisfactorily vary between about 1 to 10, with a mole ratio of 3–5 being typical. The system pressure under the foregoing conditions is essentially atmospheric. Varying pressure will change the other parameters correspondingly.

Various methods may be employed for contacting the hydrogen and terphenyl. For instance, hydrogen gas may be bubbled through a high boiler solution, or hydrogen purge gas may remove high boiler vapor to a heated zone where the reaction will take place. The reaction also may take place in a single reactor vessel contained in a hydrogen atmosphere. The primary reaction products are terphenyl (55–80%), diphenyl (10–25%), benzene (10–20%), and small amounts of toluene and water. The conversion efficiency is high, the product yield being at least about 55%. Product yields in the range of 60–70% are common.

The following examples are offered to illustrate my invention in greater detail.

The reaction apparatus is constructed of stainless steel. It consists of a pot, receiver, and a heated section of tubing between the two vessels. The volume of each vessel is approximately one quart. A 5" section of one inch tubing extends vertically from the cover of each container. The heated section is a 12" length of one inch tubing placed in a horizontal position. Thermocouples are placed in each vessel and in the elbows preceding and following the heated section. A short vertical section following the heated section is attached directly to the receiver and serves as a condenser. This and the receiver are not insulated. The pot is provided with a ¼" inlet line and a safety valve set at 20 p.s.i.g.

*Example I*

The high boilers consist essentially of 79% hexaphenyl and the remainder nonaphenyl. The hydrogan-hydrocarbon mole ratio is 3, the still pot is kept at a temperature of 400° C. and the heated section at a temperature of 350° C. The product yield is 68% and comprises 10.1% benzene, 0.3% toluene, 72.6% terphenyl, and 17% diphenyl.

*Example II*

The high boiler composition comprises a mixture of unsubstituted polyphenyls having four to nine phenyl rings and an average molecular weight of abort 540. The hydrogen-hydrocarbon mole ratio is 4, the pot is maintained at a temperature of 425° C. and the heated section at a temperature of 425° C. The product yield is 71% and comprises 10.9% benzene, 0.4% toluene, 29.7% diphenyl, and the remainder essentially terphenyl.

*Example III*

The high boiler residue is the still pot residue from the OMRE, obtained from distilling the terphenyl reactor coolant containing 30% high boiler polymer until the conditions mentioned above. The residue has the following analysis:

| | Percent |
|---|---|
| Polyphenyls (4–9 phenyl rings) | 62.1 |
| Triphenylenes | 19.0 |
| Phenanthrenes | 5.1 |
| Others (fused ring compounds, olefins, etc.) | 13.8 |

The pot is maintained at a temperature of 450° C., and the heated section at 275° C.; the hydrogen-hydrocarbon mole ratio is 3.5. The product is in a liquid state, contains 9.4% benzene, 0.3% toluene, 20% diphenyl, and 70.3% terphenyl. The product yield is 59%.

*Example IV*

The same composition as in Example III is treated with hydrogen at a hydrogen-hydrocarbon mole ratio of 4.3. The pot is maintained at a temperature of 500° C., the heated section at a temperature of 475° C. The product yield is 69%, and in a liquid state contains 14.4% benzene, 0.6% toluene, 23.3% diphenyl and 61.7% terphenyl.

*Example V*

The conditions of Example IV are employed for the hydrogenation of terphenyl. The resulting product is solid, and comprises 99.9% terphenyl, with only traces of benzene, toluene, and water.

*Example VI*

The Organic Moderated Reactor Experiment (OMRE) coolant originally has the following composition:

| | Percent |
|---|---|
| Diphenyl | 16.2 |
| Ortho-terphenyl | 45.1 |
| Meta-terphenyl | 28.9 |
| Para-terphenyl | 5.6 |
| High boilers | 0.7 |
| Unaccounted for | 3.5 |

The high boilers are permitted to build up to about 30% during reactor operation and are thereafter maintained at that level. Coolant of the following composition is sent to the open column distillation apparatus:

| | Percent |
|---|---|
| Diphenyl | 5.5 |
| Ortho-terpheny | 28.3 |
| Meta-terphenyl | 22.3 |
| Para-terphenyl | 2.3 |
| High boilers | 30.7 |
| Unaccounted for | 10 |

The still is operated at 20 mm. Hg without reflux, distillate is taken off overhead until the vapor reaches 510° F., and the distillate is returned to the reactor. The still pot residue is essentially the same as in Example III. The still bottom is then transferred to the apparatus described above, and heated to about 400° C. in the still pot. The heated section is maintained at a temperature of 550° C., and the hydrogen-hydrocarbon mole ratio is 5 to 1. The product (56% yield) is in liquid state and is returned to the reactor; it comprises 18% benzene, 0.2% toluene, 21% diphenyl, and the remainder essentially terphenyl.

It should be understood that the above examples are only illustrative rather than restrictive of my invention. My invention should be understood as limited only as indicated by the appended claims.

I claim:
1. A method of processing polyphenyl nuclear reactor coolant, which comprises withdrawing said coolant from a reactor, distilling the withdrawn coolant to separate undamaged polyphenyl coolant from degradation products, returning the distillate to the reactor, removing the still bottom residue, at least half of said residue consisting of polyphenyl compounds having at least four phenyl rings, mixing said residue with hydrogen gas, heating the resulting mixture at a temperature of about 250–575° C., and then returning the resulting reconstituted coolant to the reactor.

2. The method of claim 1 wherein the mole ratio of hydrogen gas to said residue is about 1 to 10.

3. The method of claim 1 wherein said temperature is about 400–500° C.

4. A method of processing polyphenyl nuclear reactor coolant initially containing up to three phenyl rings, which comprises withdrawing said coolant from said reactor, distilling the withdrawn coolant to separate undamaged polyphenyl fractions from high boiler degradation products, at least half of said high boiler products consisting of polyphenyl compounds having at least four phenyl rings, returning the resulting the resulting distilled lighter fraction to the reactor, forming a gaseous mixture of the resulting high boiler residue with hydrogen gas, heating the resulting mixture at a temperature of about 250–575° C., and returning the resulting reconstituted coolant to the reactor.

5. The method of claim 4 wherein the temperature is about 400–500° C.

6. The method of claim 4 wherein the hydrogen gas-high boiler mole ratio is about 1 to 10.

References Cited in the file of this patent

UNITED STATES PATENTS

| 2,364,719 | Jenkins | Dec. 12, 1944 |
| 2,883,331 | Bolt et al. | Apr. 21, 1959 |
| 2,921,891 | Colichman et al. | Jan. 17, 1960 |

OTHER REFERENCES

ANL–5121, Engineering Properties of Diphenyl, Anderson, pp. 12–15, Aug. 11, 1953.